(12) United States Patent
Miyazaki

(10) Patent No.: US 8,865,803 B2
(45) Date of Patent: Oct. 21, 2014

(54) RUBBER COMPOSITION FOR TIRES, AND PNEUMATIC TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 14/119,356

(22) PCT Filed: Jun. 19, 2012

(86) PCT No.: PCT/JP2012/065585
§ 371 (c)(1),
(2), (4) Date: Nov. 21, 2013

(87) PCT Pub. No.: WO2013/031340
PCT Pub. Date: Mar. 7, 2013

(65) Prior Publication Data
US 2014/0102611 A1    Apr. 17, 2014

(30) Foreign Application Priority Data

Aug. 26, 2011 (JP) .................................. 2011-185228
May 31, 2012 (JP) .................................. 2012-124891

(51) Int. Cl.
*B60C 1/00* (2006.01)

(52) U.S. Cl.
USPC .................. 524/83; 524/84; 524/94; 524/95; 523/156; 152/450; 152/525

(58) Field of Classification Search
USPC ........... 524/83, 84, 94, 95; 523/156; 152/525, 152/450
See application file for complete search history.

(56) References Cited

U.S. PATENT DOCUMENTS

| 2010/0130663 A1 | 5/2010 | Taguchi et al. |
| 2010/0227955 A1 | 9/2010 | Miyazaki |
| 2010/0256258 A1 | 10/2010 | Miyazaki |

FOREIGN PATENT DOCUMENTS

| JP | 2006-063093 A | 3/2006 |
| JP | 2006-63093 A | 3/2006 |
| JP | 2009-007549 | * 1/2009 |
| JP | 2009-7549 A | 1/2009 |
| JP | 2009-155632 A | 7/2009 |
| JP | 2009-161653 A | 7/2009 |
| JP | 2009161653 A | 7/2009 |
| JP | 2010-090291 | * 4/2010 |
| JP | 2010-90291 A | 4/2010 |
| JP | 2010-090291 A | 4/2010 |
| JP | 2010-280782 | * 12/2010 |
| JP | 2010-280782 A | 12/2010 |
| JP | 2011-126927 A | 6/2011 |
| JP | 2011-126930 A | 6/2011 |
| WO | 2008/139762 A1 | 11/2008 |
| WO | 2009/072560 A1 | 6/2009 |

OTHER PUBLICATIONS

International Search Report for PCT/JP2012/065585 dated Sep. 11, 2012.

* cited by examiner

*Primary Examiner* — Robert D. Harlan
(74) *Attorney, Agent, or Firm* — Birch, Stewart, Kolasch & Birch, LLP

(57) ABSTRACT

The invention relates to a rubber composition for a tire, containing an isoprene-based rubber and a compound represented by formula (1) below, wherein an amount of the isoprene-based rubber is at least 70% by mass; and an amount of the compound represented by formula (1) is 0.5-6 parts by mass per 100 parts by mass of the rubber component. The invention also relates to a rubber composition for a tire, containing an alkylphenol-sulfur chloride condensate and a compound represented by formula (1) below, wherein an amount of the alkylphenol-sulfur chloride condensate is 0.4-6 parts by mass, and an amount of the compound represented by formula (1) is 0.5-6 parts by mass, each per 100 parts by mass of a rubber component of the rubber composition:

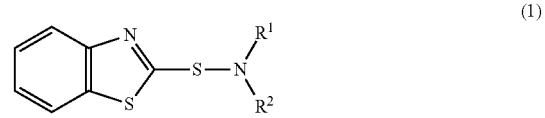

(1)

wherein $R^1$ represents a $C_2$-$C_{16}$ alkyl group; and $R^2$ represents a $C_3$-$C_{16}$ alkyl, benzothiazolyl-sulfide, or cycloalkyl group.

20 Claims, No Drawings

RUBBER COMPOSITION FOR TIRES, AND PNEUMATIC TIRE

TECHNICAL FIELD

The present invention relates to a rubber composition for a tire, and a pneumatic tire including the rubber composition.

BACKGROUND ART

Tire components such as a tread, inner liner, and sidewall usually include natural rubber and carbon black. Since these materials easily cause scorching, the incorporation of large amounts of these materials may easily cause compound scorch during the manufacturing process. The above tire components may also include an alkylphenol-sulfur chloride condensate, which also easily causes scorching, and thus have the problem of compound scorch.

Compound scorch can be prevented by, for example, a method of kneading the materials at a temperature of not higher than 140° C. or a method of extruding a rubber compound at a temperature of not higher than 120° C. Unfortunately, these methods cause poor dispersibility of filler and poor productivity.

Compound scorch can also be prevented by retarding the curing rate through the addition of wet silica with hydroxy groups or the reduced use of sulfur; however, these methods may decrease abrasion resistance, hardness (handling stability), tensile strength at break, and other properties. There is also a method of adding DCBS as a vulcanization accelerator, but DCBS is designated as one of the chemical substances subject to type I monitoring and is thus undesirable in view of environmental and other impacts.

Other known methods for retarding the curing rate include a method of adding a vulcanization retarder such as PVI. Unfortunately, the use of such a retarder in an amount of 0.5 parts or more may cause blooming during the rubber processing or after vulcanization. Additionally, when the quality varies among raw materials or under a condition where compound scorch is likely to occur (e.g., during the extremely hot season), PVI is usually added at the discretion of an on-site operator. In view of such circumstances, it is desirable to set the design center value of the PVI content of each tire component to zero.

Patent Literature 1 suggests a rubber composition for a tire cord topping containing natural rubber, a specific vulcanization accelerator and other materials. However, there is still room for improvement in terms of providing a pneumatic tire that can be produced at a good curing rate and, at the same time, provides improved processability, handling stability, fuel economy, and tensile strength at break in a balanced manner.

CITATION LIST

Patent Literature

Patent Literature 1: JP-A 2009-7549

SUMMARY OF INVENTION

Technical Problem

The present invention aims to solve the above problems and provide a rubber composition for a tire and a pneumatic tire including the rubber composition, wherein the rubber composition provides improved processability, handling stability, fuel economy, and tensile strength at break in a balanced manner while achieving a good curing rate.

Solution to Problem

The present invention relates to a rubber composition for a tire (first rubber composition), containing an isoprene-based rubber and a compound represented by formula (1) below, wherein an amount of the isoprene-based rubber is at least 70% by mass based on 100% by mass of a rubber component of the rubber composition; and an amount of the compound represented by formula (1) is 0.5 to 6 parts by mass per 100 parts by mass of the rubber component:

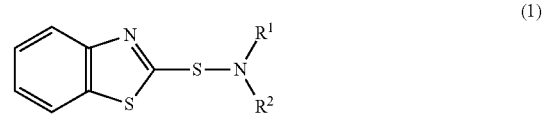

wherein $R^1$ represents a $C_2$-$C_{16}$ alkyl group; and $R^2$ represents a $C_3$-$C_{16}$ alkyl, benzothiazolyl-sulfide, or cycloalkyl group.

The present invention relates to a rubber composition for a tire (second rubber composition), containing an alkylphenol-sulfur chloride condensate and a compound represented by formula (1) below, wherein an amount of the alkylphenol-sulfur chloride condensate is 0.4 to 6 parts by mass, and an amount of the compound represented by formula (1) is 0.5 to 6 parts by mass, each per 100 parts by mass of a rubber component of the rubber composition:

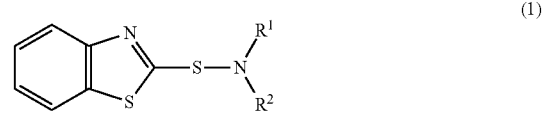

wherein $R^1$ represents a $C_2$-$C_{16}$ alkyl group; and $R^2$ represents a $C_3$-$C_{16}$ alkyl, benzothiazolyl-sulfide, or cycloalkyl group.

Preferably, the first or second rubber composition contains sulfur and at least one of a guanidine vulcanization accelerator and N,N'-dicyclohexyl-2-benzothiazolyl sulfenamide, wherein an amount of the sulfur is 0.7 to 3 parts by mass, and a combined amount of the guanidine vulcanization accelerator and the N,N'-dicyclohexyl-2-benzothiazolyl sulfenamide is not more than 0.7 parts by mass, each per 100 parts by mass of the rubber component.

Preferably, in the first or second rubber composition, an amount of carbon black is 30 to 80 parts by mass, an amount of wet silica is not more than 20 parts by mass, and the amount of the compound represented by formula (1) is 1 to 4 parts by mass, each per 100 parts by mass of the rubber component.

Preferably, in the first or second rubber composition, a time t10 required for reaching ML+0.1 ME is 2.0 to 6.0 minutes, where ML, MH, and ME are a minimum torque, a maximum torque, and a difference therebetween (MH−ML), respectively, in a curing rate curve measured at 160° C. with a curelastometer.

Preferably, the first or second rubber composition further contains a coumarone-indene resin and is for use in at least one of a tread and a sidewall.

Preferably, the first rubber composition further contains an epoxidized natural rubber and is for use in an inner liner.

The present invention also relates to a pneumatic tire, including a tread, inner liner, sidewall, clinch, base tread, or tie gum including the rubber composition defined above.

Advantageous Effects of Invention

The rubber composition for a tire of the present invention contains predetermined amounts of an isoprene-based rubber and/or an alkylphenol-sulfur chloride condensate, and a predetermined amount of a specific compound. Thus, the present invention can provide a pneumatic tire providing improved processability, handling stability, fuel economy, and tensile strength at break in a balanced manner, and showing a good curing rate during the tire manufacturing.

DESCRIPTION OF EMBODIMENTS

The first rubber composition for a tire of the present invention contains an isoprene-based rubber and a compound represented by formula (1) above, wherein the amount of the isoprene-based rubber is at least a specific amount based on 100% by mass of the rubber component of the rubber composition, and the amount of the compound represented by formula (1) is limited to a specific amount per 100 parts by mass of the rubber component. The second rubber composition for a tire of the present invention contains an alkylphenol-sulfur chloride condensate and a compound represented by formula (1) above, wherein the amount of the alkylphenol-sulfur chloride condensate and the amount of the compound represented by formula (1) are limited to specific amounts per 100 parts by mass of the rubber component of the rubber composition.

Rubber compositions containing a large amount of isoprene-based rubber or a large amount of alkylphenol-sulfur chloride condensate are likely to be cured at a faster rate and thus easily scorched. In contrast, the present invention, in which any one of these components is used in combination with a specific vulcanization accelerator, not only provides a good curing rate during the tire manufacturing, but also synergistically improves the property balance between processability, handling stability, fuel economy, and tensile strength at break. The present invention can also suppress reversion in a favorable manner.

The first rubber composition containing a large amount of isoprene-based rubber can be suitably used for treads and inner liners. Examples of isoprene-based rubbers that can be used in the first rubber composition include natural rubber (NR), isoprene rubber (IR), and epoxidized natural rubber (ENR). Particularly, in the use in a tread, it is preferred to use NR or IR for achieving good handling stability, fuel economy, and tensile strength at break. In the use in an inner liner, it is preferred to use ENR for achieving good tensile strength at break and excellent air retention properties. Such use contributes to a synergistic improvement of the property balance mentioned above. The use of ENR in an inner liner improves the air permeation properties than the use of NR does, and also improves the tan δ than the use of butyl rubber does. Therefore, it contributes to a synergistic improvement in these properties.

Any NR commonly used in the tire industry, such as SIR20, RSS#3, TSR20, or ENR25, can be used. Any IR commonly used in the tire industry can be used.

The ENR to be used may be a commercially available product (such as ENR25 or ENR50 (Kumpulan Guthrie Berhad)). Or alternatively, natural rubber (NR) may be epoxidized and then used as ENR. NR may be epoxidized by any method such as chlorohydrin method, direct oxidation method, hydrogen peroxide method, alkyl hydroperoxide method, or peracid method. NR commonly used in the tire industry can be used in the epoxidation.

The ENR preferably has a degree of epoxidation of not less than 12 mol %, more preferably not less than 20 mol % ENR having a degree of epoxidation of less than 12 mol % may have low reversion resistance and may insufficiently produce the effect of improving the air retention properties. The ENR preferably has a degree of epoxidation of not more than 50 mol %, more preferably not more than 30 mol %. If the degree of epoxidation is more than 50 mol %, the rubber strength and fuel economy of the resulting rubber composition tend to be insufficient. The term "degree of epoxidation" herein refers to a ratio of the number of epoxidized carbon-carbon double bonds to the total number of carbon-carbon double bonds in an unepoxidized natural rubber component. The degree of epoxidation can be determined, for example, by a method such as titration analysis or nuclear magnetic resonance (NMR) analysis.

In the first rubber composition, the isoprene-based rubber content based on 100% by mass of the rubber component of the rubber composition is not less than 70% by mass, preferably not less than 90% by mass, and may be 100% by mass. The effects of providing a proper curing rate and improving the rubber properties are more effectively achieved with a greater amount of isoprene-based rubber. In the case of using the first rubber composition in a tread (particularly, a tread of a tire for trucks and buses in which a severely high tensile strength at break is required), it is preferred that the combined amount of NR and IR be as described above. In the use in an inner liner, it is preferred that the amount of ENR be as described above.

Any other rubber can be used in addition to the isoprene-based rubber in the rubber component of the first rubber composition. Examples thereof include styrene butadiene rubber (SBR), butadiene rubber (BR), acrylonitrile butadiene rubber (NBR), chloroprene rubber (CR), butyl rubber (IIR), and styrene-isoprene-butadiene copolymer rubber (SIBR).

In the case of using the first rubber composition in a tread, it is preferred to use BR in terms of achieving good abrasion resistance and a good curing rate. Any BR can be used. In the use in a tread, it is preferred to use a BR having a cis double bond content of at least 95 mol % (high-cis BR) in terms of achieving good abrasion resistance, curing rate, and elongation at break.

In the case of using the first rubber composition in a tread, the BR content based on 100% by mass of the rubber component is preferably 10 to 30% by mass. The content within a range mentioned above allows the effects of the present invention to be achieved and also provides good abrasion resistance.

In the case of using the first rubber composition in an inner liner, it is preferred to use a butyl-based rubber in terms of achieving good air retention properties and degradation resistance. Examples of usable butyl-based rubbers include halogenated butyl rubbers (X-IIR) such as brominated butyl rubber (Br-IIR) and chlorinated butyl rubber (Cl-IIR), and butyl rubber (IIR). Among these, X-IIR such as Cl-IIR is preferably used in terms of reducing the heat build-up.

In the case of using the first rubber composition in an inner liner, the butyl-based rubber content based on 100% by mass of the rubber component is preferably not less than 5% by mass, and more preferably not less than 20% by mass. The content is preferably not more than 30% by mass. The content within a range mentioned above can lead to a favorably low heat build-up.

On the other hand, the second rubber composition containing an alkylphenol-sulfur chloride condensate can be suitably used for sidewalls. Any rubber component can be used in the second rubber composition, and those mentioned for the first rubber composition can be used. Particularly, in the use in a sidewall, it is preferred to use an isoprene-based rubber such as NR or IR in terms of achieving good processability, fuel economy, and tensile strength at break, whereas it is preferred to use BR in terms of achieving good crack growth resistance and abrasion resistance. A combination use of these rubbers is particularly preferred. Such a combination use contributes to a synergistic improvement of the above property balance.

In the case of using the second rubber composition in a sidewall, the isoprene-based rubber content based on 100% by mass of the rubber component is preferably not less than 10% by mass, and more preferably not less than 35% by mass. If the content is less than 10% by mass, the rubber strength may be insufficient. The content is preferably not more than 80% by mass, and more preferably not more than 65% by mass. If the content is more than 80% by mass, the flex crack growth resistance tends to be insufficient.

In the case of using the second rubber composition in a sidewall, BR may suitably be used. The BR to be used is preferably a tin-modified butadiene rubber (tin-modified BR) in terms of achieving good properties such as good fuel economy, or a 1,2-syndiotactic polybutadiene crystal-containing butadiene rubber (SPB-containing BR) in terms of achieving excellent crack growth resistance and abrasion resistance. A combination use of these rubbers is particularly preferred. Such a combination use contributes to a synergistic improvement of the above property balance.

While any tin-modified BR can be used, it is preferred to use a tin-modified BR polymerized with a lithium initiator and having a tin atom content of 50 to 3000 ppm, a vinyl content of 5 to 50% by mass, and a molecular weight distribution of 2 or less.

Preferably, the tin-modified BR is obtained by polymerizing 1,3-butadiene with a lithium initiator and subsequently adding a tin compound thereto, and has a tin-carbon bond at a molecular terminal.

Examples of lithium initiators include lithium compounds such as alkyllithiums and aryllithiums. Examples of tin compounds include tin tetrachloride and butyltin trichloride.

The tin-modified BR has a tin atom content of not less than 50 ppm. If the content is less than 50 ppm, the tan δ tends to increase. The tin atom content is also not more than 3,000 ppm, preferably not more than 300 ppm. If the content is more than 3,000 ppm, the processability tends to be poor.

The molecular weight distribution (Mw/Mn) of the tin-modified BR is not more than 2. If the Mw/Mn is more than 2, the tan δ tends to increase. The lower limit of the molecular weight distribution is not particularly limited, and is preferably not less than 1.

The weight average molecular weight (Mw) and the number average molecular weight (Mn) herein can be determined by gel permeation chromatography (GPC) (GPC-8000 series available from Tosoh Corporation; detector: differential refractometer; column: TSKGEL SUPERMALTPORE HZ-M available from Tosoh Corporation) relative to polystyrene standards.

The vinyl content of the tin-modified BR is not less than 5% by mass. A tin-modified BR with a vinyl content of less than 5% by mass is difficult to prepare. The vinyl content is not more than 50% by mass, preferably not more than 20% by mass. If the content is more than 50% by mass, carbon black tends to have poor dispersibility in such a rubber, so that the fuel economy and tensile strength are likely to decrease.

The vinyl content (1,2-butadiene unit content) herein can be measured by infrared absorption spectrum analysis.

In the case of using the second rubber composition in a sidewall, the tin-modified BR content based on 100% by mass of the rubber component is preferably not less than 10% by mass, and more preferably not less than 15% by mass. If the content is less than 10% by mass, the effect of improving the fuel economy may be insufficient. The content is preferably not more than 60% by mass, and more preferably not more than 30% by mass. If the content is more than 60% by mass, the processability and elongation at break tend to decrease.

While any SPB-containing BR commonly used in the manufacture of tires can be used in the second rubber composition, it is preferred to use one in which 1,2-syndiotactic polybutadiene crystals are chemically bonded to the butadiene matrix and dispersed therein, in terms of achieving the above properties in a favorable manner.

The melting point of the 1,2-syndiotactic polybutadiene crystals is preferably not lower than 180° C., and more preferably not lower than 190° C. The melting point is also preferably not higher than 220° C., and more preferably not higher than 210° C. If the melting point is below the lower limit, the SPB-containing BR may insufficiently produce the effect of improving the handling stability. If the melting point is above the upper limit, the processability tends to be poor.

The SPB-containing BR preferably has a 1,2-syndiotactic polybutadiene crystal content (amount of matter insoluble in boiling n-hexane) of not less than 2.5% by mass, more preferably not less than 10% by mass. If the content is less than 2.5% by mass, the reinforcing effect (E*) may be insufficient. The content is preferably not more than 20% by mass, and more preferably not more than 18% by mass. If the content is more than 20% by mass, the processability tends to be poor.

In the case of using the second rubber composition in a sidewall, the SPB-containing BR content based on 100% by mass of the rubber component is preferably not less than 10% by mass, and more preferably not less than 20% by mass. If the content is less than 10% by mass, the crack growth resistance, abrasion resistance, and extrusion processability may be insufficient. The content is preferably not more than 60% by mass, and more preferably not more than 30% by mass. If the content is more than 60% by mass, the fuel economy may be insufficient.

In the case of using the second rubber composition in a sidewall, the BR content (total BR content including tin-modified BR and SPB-containing BR) based on 100% by mass of the rubber component is preferably not less than 20% by mass, and more preferably not less than 40% by mass. The content is preferably not more than 80% by mass, and more preferably not more than 60% by mass. The content within a range mentioned above allows the crack growth resistance, abrasion resistance, processability, fuel economy, and tensile strength at break to be achieved in a favorable manner.

While any alkylphenol-sulfur chloride condensate can be used in the second rubber composition, it is preferred to use a compound represented by formula (2) below in terms of achieving the properties such as low heat build-up and hardness in a favorable manner as well as suppressing reversion.

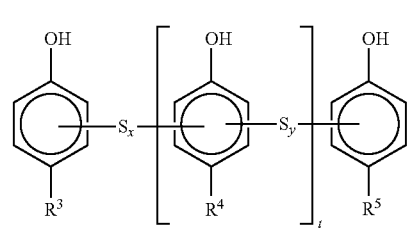

(2)

In the formula, $R^3$, $R^4$, and $R^5$ are the same or different and each represent a $C_5$-$C_{12}$ alkyl group; x and y are the same or different and each represent an integer of 1 to 3; and t represents an integer of 0 to 250.

In terms of achieving good dispersibility of the alkylphenol-sulfur chloride condensate in the rubber component, t is preferably an integer of 0 to 250, more preferably an integer of 0 to 100, still more preferably an integer of 10 to 100, and particularly preferably an integer of 20 to 50. In terms of efficiently providing high hardness, x and y are preferably both 2. In terms of achieving good dispersibility of the alkylphenol-sulfur chloride condensate in the rubber component, $R^3$ to $R^5$ are each preferably a $C_6$-$C_9$ alkyl group.

The alkylphenol-sulfur chloride condensate can be prepared by any known method. For example, an alkylphenol and a sulfur chloride are reacted with each other in a molar ratio of, for example, 1:0.9-1.25. Specific examples of the alkylphenol-sulfur chloride condensate include Tackirol V200 (formula (3) below) available from Taoka Chemical Co., Ltd.

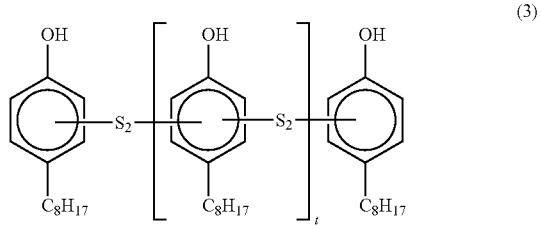

(3)

In the formula, t represents an integer of 0 to 100.

In the second rubber composition, the alkylphenol-sulfur chloride condensate content per 100 parts by mass of the rubber component is not less than 0.4 parts by mass, preferably not less than 0.5 parts by mass. If the content is less than 0.4 parts by mass, the effects of improving the handling stability and fuel economy may be insufficient. The content is not more than 6 parts by mass, preferably not more than 5 parts by mass. If the content is more than 6 parts by mass, the curing rate may be too fast, causing compound scorch. The second rubber composition having an alkylphenol-sulfur chloride condensate content within a range mentioned above can be suitably used for sidewalls.

The first rubber composition may also contain an alkylphenol-sulfur chloride condensate. In the case of using the first rubber composition in a tread or an inner liner, the upper limit of the alkylphenol-sulfur chloride condensate content per 100 parts by mass of the rubber component is preferably not more than 2.5 parts by mass, and more preferably not more than 1 part by mass. The lower limit of the content per 100 parts by mass of the rubber component is preferably not less than 0.2 parts by mass. The content in a range mentioned above allows the curing rate, processability, handling stability, fuel economy, and tensile strength at break to be achieved in a favorable manner.

The first and second rubber compositions each contain a compound represented by the following formula (1):

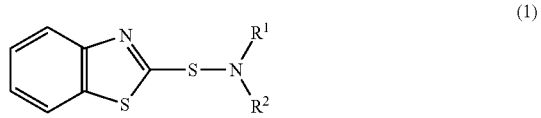

(1)

wherein $R^1$ represents a $C_2$-$C_{16}$ alkyl group; and $R^2$ represents a $C_3$-$C_{16}$ alkyl, benzothiazolyl-sulfide, or cycloalkyl group.

The alkyl group represented as $R^1$ preferably has a branched structure because then the effects of the present invention can be achieved in a favorable manner. The alkyl group having a branched structure is preferably a linear alkyl group represented by —$(CH_2)_k$—$CH_3$ in which at least one hydrogen atom contained in the carbon chain $(CH_2)_k$ is substituted with an alkyl group (i.e., a linear alkyl group having a branched structure).

The number of carbon atoms in the alkyl group represented as $R^1$ is preferably 3 to 16, more preferably 4 to 16, and still more preferably 6 to 12. If the number is 1, the adsorption of the compound is likely to occur, whereas if the number is 17 or greater, the hardness tends to decrease.

Preferred examples of the alkyl group represented as $R^1$ include ethyl, t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl groups.

The alkyl group represented as $R^2$ preferably has a branched structure because then the effects of the present invention can be achieved in a favorable manner. The alkyl group having a branched structure is preferably as mentioned above for $R^1$.

The number of carbon atoms in the alkyl group represented as $R^2$ is preferably 4 to 16, and more preferably 6 to 12. If the number is 2 or smaller, the adsorption of the compound is likely to occur, whereas if the number is 17 or greater, the hardness tends to decrease.

Preferred examples of the alkyl group represented as $R^2$ include t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, and 2-ethyloctyl groups.

The benzothiazolyl-sulfide group represented as $R^2$ is a group represented by the following formula.

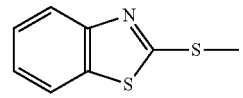

The number of carbon atoms in the cycloalkyl group represented as $R^2$ is preferably 3 to 16. Preferred examples of the cycloalkyl group represented as $R^2$ include a cyclohexyl group.

In terms of achieving the curing rate, processability, handling stability, fuel economy, and tensile strength at break at high levels, $R^2$ is preferably a benzothiazolyl-sulfide group when $R^1$ is a t-butyl group.

Examples of the compound represented by formula (1) include BEHZ (N,N-di(2-ethylhexyl)-2-benzothiazolyl sulfenamide) available from Kawaguchi Chemical Industry Co., LTD., BMHZ (N,N-di(2-methylhexyl)-2-benzothiazolyl sulfenamide) available from Kawaguchi Chemical Industry Co., LTD., Santocure TBSI (N-tert-butyl-2-benzothiazolyl sulfenimide) available from Flexsys, and ETZ (N-ethyl-N-t-butylbenzothiazole-2-sulfenamide) available from Ouchi Shinko Chemical Industrial Co., Ltd.

In the first or second rubber composition, the amount of the compound represented by formula (1) per 100 parts by mass of the rubber component is not less than 0.5 parts by mass, preferably not less than 1 part by mass. If the amount is less than 0.5 parts by mass, the effects of the present invention may be insufficient. The amount is not more than 6 parts by mass, preferably not more than 4 parts by mass. If the amount is more than 6 parts by mass, the tensile strength at break may be insufficient.

The first or second rubber composition may contain other vulcanization accelerators such as guanidine vulcanization accelerators (e.g. 1,3-diphenylguanidine) and N,N'-dicyclohexyl-2-benzothiazolyl sulfenamide. In this case, the combined amount of guanidine vulcanization accelerators and N,N'-dicyclohexyl-2-benzothiazolyl sulfenamide per 100 parts by mass of the rubber component is preferably not more than 0.7 parts by mass in terms of the properties such as fuel economy and tensile strength at break.

The first or second rubber composition typically contains sulfur. The amount of sulfur per 100 parts by mass of the rubber component is preferably not less than 0.7 parts by mass, and more preferably not less than 0.8 parts by mass, in terms of providing excellent handling stability. The amount is preferably not more than 3 parts by mass, and more preferably not more than 2.7 parts by mass, from the viewpoints of abrasion resistance and elongation at break. Herein, the amount of sulfur is the net sulfur content. In the case where insoluble sulfur is used, it is the amount excluding oil.

The first or second rubber composition preferably contains a compound represented by formula (4) below. This enables the rubber composition to incorporate a CC bond having high thermal stability and contributes to a synergistic improvement in the curing rate, processability, handling stability, fuel economy, and tensile strength at break; therefore, the above property balance can be provided at a high level.

$$R^{11}-S-S-W-S-S-R^{12} \qquad (4)$$

In the formula, W represents a $C_2$-$C_{10}$ alkylene group; and $R^{11}$ and $R^{12}$ are the same or different and each represent a monovalent organic group containing a nitrogen atom.

Examples of the ($C_2$-$C_{10}$) alkylene group represented as W include, but not limited to, linear, branched, and cyclic groups. Among these, linear alkylene groups are preferred. The number of carbon atoms is preferably 4 to 8. If the number of carbon atoms in the alkylene group is 1, the thermal stability tends to be so poor that the presence of the alkylene group is unlikely to be effective. If the number of carbon atoms is 11 or larger, a crosslinking chain represented by —S—S—W—S—S— tends to be difficult to form.

Examples of alkylene groups that satisfy the above conditions include ethylene, trimethylene, tetramethylene, pentamethylene, hexamethylene, heptamethylene, octamethylene, and decamethylene groups. Among these, a hexamethylene group is preferred because the crosslinking chain represented by —S—S—W—S—S— can be smoothly formed between polymer molecules and it is also thermally stable.

While $R^{11}$ and $R^{12}$ each may be any monovalent organic group containing a nitrogen atom, those having at least one aromatic ring are preferred, and those containing a linking group represented by N—C(=S)— in which the carbon atom is bonded to the dithio group are more preferred. $R^{11}$ and $R^{12}$ may be the same as or different from each other, and are preferably the same because of its advantages such as easy manufacturing.

Examples of the compound represented by formula (4) include 1,2-bis(N,N'-dibenzylthiocarbamoyldithio)ethane, 1,3-bis(N,N'-dibenzylthiocarbamoyldithio)propane, 1,4-bis(N,N'-dibenzylthiocarbamoyldithio)butane, 1,5-bis(N,N'-dibenzylthiocarbamoyldithio)pentane, 1,6-bis(N,N'-dibenzylthiocarbamoyldithio)hexane, 1,7-bis(N,N'-dibenzylthiocarbamoyldithio)heptane, 1,8-bis(N,N'-dibenzylthiocarbamoyldithio)octane, 1,9-bis(N,N'-dibenzylthiocarbamoyldithio)nonane, and 1,10-bis(N,N'-dibenzylthiocarbamoyldithio)decane. Among these, 1,6-bis(N,N'-dibenzylthiocarbamoyldithio)hexane is preferred because of its thermal stability and excellent polarizability.

In the first or second rubber composition, the amount of the compound represented by formula (4) per 100 parts by mass of the rubber component is preferably not less than 0.5 parts by mass, and more preferably not less than 1.5 parts by mass. If the amount is less than 0.5 parts by mass, the addition of the compound represented by formula (4) may insufficiently produce its effect. The amount is preferably not more than 5 parts by mass, and more preferably not more than 2.5 parts by mass. If the amount is more than 5 parts by mass, the crosslink density may be so high that the abrasion resistance can be deteriorated.

The first or second rubber composition preferably contains carbon black. This provides good reinforcement and thus contributes to achieving the effects of the present invention in a favorable manner.

In the case of using the first rubber composition in a tread, the cetyltrimethylammonium bromide (CTAB) adsorption specific surface area of the carbon black is preferably not less than 100 $m^2$/g, and more preferably not less than 150 $m^2$/g. The CTAB adsorption specific surface area is preferably not more than 200 $m^2$/g, and more preferably not more than 180 $m^2$/g. The CTAB adsorption specific surface area within a range mentioned above can lead to good processability, handling stability, fuel economy, and tensile strength at break.

In the case of using the first rubber composition in an inner liner and in the case of using the second rubber composition in a sidewall, the cetyltrimethylammonium bromide (CTAB) adsorption specific surface area of the carbon black is preferably not less than 20 $m^2$/g, and more preferably not less than 30 $m^2$/g. The CTAB adsorption specific surface area is preferably not more than 100 $m^2$/g, and more preferably not more than 50 $m^2$/g. The CTAB adsorption specific surface area within a range mentioned above can lead to good processability, handling stability, fuel economy, and tensile strength at break.

The cetyltrimethylammonium bromide (CTAB) adsorption specific surface area is measured by the method described in JIS K6217-3:2001.

In the case of using the first rubber composition in a tread, the COAN of the carbon black is preferably not less than 50 mL/100 g, and more preferably not less than 90 mL/100 g. The COAN is also preferably not more than 130 mL/100 g, and more preferably not more than 110 mL/100 g. The COAN within a range mentioned above can lead to good abrasion resistance, handling stability, fuel economy, and tensile strength at break.

In the case of using the first rubber composition in an inner liner and in the case of using the second rubber composition in a sidewall, the COAN of the carbon black is preferably not less than 50 mL/100 g, and more preferably not less than 70 mL/100 g. The COAN is also preferably not more than 130 mL/100 g, and more preferably not more than 90 mL/100 g. The COAN within a range mentioned above can lead to good handling stability, fuel economy, and tensile strength at break.

Herein, the COAN of carbon black is measured in accordance with ASTM D3493. The oil used is dibutylphthalate (DBP).

In the first or second rubber composition, while the carbon black content is not particularly limited, the carbon black content per 100 parts by mass of the rubber component is preferably not less than 3 parts by mass, and more preferably not less than 30 parts by mass, in terms of achieving good reinforcement, good resistance to ultraviolet light degradation, and good abrasion resistance. The content is preferably not more than 80 parts by mass.

In the case of using the first rubber composition in a tread and in the case of using the second rubber composition in a sidewall, the carbon black content per 100 parts by mass of the rubber component is preferably not less than 25 parts by mass, and more preferably not less than 40 parts by mass. The content is preferably not more than 60 parts by mass, and more preferably not more than 55 parts by mass. The content within a range mentioned above provides good reinforcement, and allows the effects of the present invention to be achieved in a favorable manner.

In the case of using the first rubber composition in an inner liner, the carbon black content per 100 parts by mass of the rubber component is preferably not less than 3 parts by mass. The content is preferably not more than 60 parts by mass, and more preferably not more than 55 parts by mass. The content within a range mentioned above provides good reinforcement and good resistance to ultraviolet light degradation, and allows the effects of the present invention to be achieved in a favorable manner.

The first or second rubber composition preferably contains wet silica (hydrous silica). In particular, wet silica is suitably used in the case of using the first rubber composition in an inner liner. This ensures reinforcement and elongation at break and, at the same time, retards the curing rate, thus contributing to achieving the above properties in a balanced manner.

In particular, in the case of using the first rubber composition in a tread and in the case of using the second rubber composition in a sidewall, the nitrogen adsorption specific surface area ($N_2SA$) of the wet silica is preferably not less than 50 $m^2/g$, and more preferably not less than 150 $m^2/g$. The $N_2SA$ is preferably not more than 200 $m^2/g$. The $N_2SA$ within a range mentioned above allows the effects of the present invention to be achieved in a favorable manner.

In the case of using the first rubber composition in an inner liner (i.e., as a rubber composition for an inner liner), the nitrogen adsorption specific surface area ($N_2SA$) of the wet silica is preferably not less than 50 $m^2/g$, and more preferably not less than 75 $m^2/g$. The $N_2SA$ is preferably not more than 230 $m^2/g$, and more preferably not more than 130 $m^2/g$. The $N_2SA$ within a range mentioned above allows the effects of the present invention to be achieved in a favorable manner.

The values of $N_2SA$ of wet silica are determined by the BET method in accordance with ASTM D3037-81.

In the first or second rubber composition, the wet silica content per 100 parts by mass of the rubber component is preferably not less than 1 part by mass. The content is preferably not more than 50 parts by mass, and more preferably not more than 40 parts by mass. The content within a range mentioned above provides good abrasion resistance, wet grip performance, fuel economy, and curing rate, and allows the effects of the present invention to be achieved in a favorable manner.

In particular, in the case of using the first rubber composition in a tread and in the case of using the second rubber composition in a sidewall, the wet silica content per 100 parts by mass of the rubber component is preferably not less than 5 parts by mass. The content is preferably not more than 20 parts by mass, and more preferably not more than 15 parts by mass. The content within a range mentioned above provides good reinforcement, abrasion resistance, elongation at break, fuel economy, and curing rate, and allows the effects of the present invention to be achieved in a favorable manner.

In the case of using the first rubber composition in an inner liner, the wet silica content per 100 parts by mass of the rubber component is preferably not less than 5 parts by mass. The content is preferably not more than 50 parts by mass, and more preferably not more than 45 parts by mass. The content within a range mentioned above provides good reinforcement, elongation at break, fuel economy, and curing rate, and allows the effects of the present invention to be achieved in a favorable manner.

The first or second rubber composition may contain a coumarone-indene resin. In particular, a coumarone-indene resin is suitably used in the case of using the first rubber composition in a tread and of using the second rubber composition in a sidewall. This provides excellent fuel economy and tensile strength at break and contributes to a synergistic improvement in the curing rate, processability, handling stability, fuel economy, and tensile strength at break; therefore, the property balance mentioned above can be provided at a high level. In particular, in the case of using the first rubber composition in a tread, the use of a coumarone-indene resin increases tan $\delta$ and EB and improves the wet grip performance. This is thought to be because the coumarone-indene resin added in a tread formulation roughens the surface to be worn by the contact with the road surface, or provides better contact between the rubber and the road surface and a better scratching effect. The use of a coumarone-indene resin in a sidewall also increases tan $\delta$ and EB and improves the crack growth resistance. This is thought to be because it improves the filler micro-dispersion or the polymer dispersion.

The softening point of the coumarone-indene resin is preferably not lower than −20° C., and more preferably not lower than 0° C. The softening point is also preferably not higher than 60° C., more preferably not higher than 35° C., and still more preferably not higher than 15° C. The softening point within a range mentioned above allows the above properties to be achieved in a favorable manner.

In the case of using the first rubber composition in a tread and in the case of using the second rubber composition in a sidewall, the coumarone-indene resin content per 100 parts by mass of the rubber component is preferably not less than 0.5 parts by mass, and more preferably not less than 1.5 parts by mass. If the content is less than 0.5 parts by mass, the addition of the coumarone-indene resin may insufficiently produce the improving effects. The content is also preferably not more than 10 parts by mass, and more preferably not more than 4 parts by mass. If the content is more than 10 parts by mass, the fuel economy and elongation at break tend to be insufficient.

The first or second rubber composition may contain a C5 petroleum resin. In particular, a C5 petroleum resin is suitably used in the case of using the second rubber composition in a sidewall. This contributes to a synergistic improvement in the processability, handling stability, fuel economy, and tensile strength at break; therefore, the above property balance can be significantly improved. Examples of C5 petroleum resins include aliphatic petroleum resins formed mainly from olefins and diolefins in C5 fraction obtained by naphtha cracking.

The softening point of the C5 petroleum resin is preferably not lower than 50° C., and more preferably not lower than 80° C. The softening point is also preferably not higher than 150° C., and more preferably not higher than 120° C. The softening point within a range mentioned above allows the above properties to be achieved in a favorable manner.

The "softening point" herein, which is measured as set forth in JIS K 6220-1:2001 with a ring and ball softening point apparatus, is a temperature at which the ball drops down.

In the case of using the second rubber composition in a sidewall, the C5 petroleum resin content per 100 parts by mass of the rubber component is preferably not less than 0.5 parts by mass, and more preferably not less than 1.5 parts by mass. The content is also preferably not more than 10 parts by mass, and more preferably not more than 3 parts by mass. The content within a range mentioned above allows the above properties to be improved in a balanced manner.

In the case of using the first rubber composition in an inner liner, the first rubber composition may contain an alkaline salt of a fatty acid and a metal. The alkaline salt of a fatty acid and a metal neutralizes the acid that is used in the ENR synthesis, thus preventing heat-induced degradation during kneading of ENR or vulcanization. It can also prevent reversion.

Preferred metals that can be used to form the alkaline salt of a fatty acid and a metal are calcium and barium in terms of increasing the effect of improving the heat resistance and providing compatibility with epoxidized natural rubber. Preferred examples of such an alkaline salt of a fatty acid and a metal are calcium stearate and calcium oleate because they are more effective in improving the heat resistance and are more compatible with epoxidized natural rubber, and their costs are also relatively inexpensive.

In the case of using the first rubber composition in an inner liner, the amount of the alkaline salt of a fatty acid and a metal per 100 parts by mass of ENR is preferably not less than 1 part by mass, and more preferably not less than 1.5 parts by mass. If the amount is less than 1 part by mass, the addition of the alkaline salt of a fatty acid and a metal may insufficiently produce its effect. The amount is preferably not more than 10 parts by mass, and more preferably not more than 5 parts by mass. If the amount is more than 10 parts by mass, the tensile strength at break and abrasion resistance tend to be poor.

The rubber compositions of the present invention may appropriately contain, in addition to the components mentioned above, additives that are generally used to prepare a rubber composition, such as various types of antioxidants, wax, stearic acid, zinc oxide, oil, and vulcanizing agents.

The rubber compositions of the present invention can be prepared using any known method, for example, in which the components are mixed and kneaded using a rubber kneading device such as an open roll mill or Banbury mixer and subsequently vulcanized.

As described above, the first and second rubber compositions can be suitably used for treads (particularly, treads of tires for trucks and buses), inner liners, and sidewalls, and are also applicable to other tire components such as clinches, base treads, and tie gums.

In terms of productivity and uniformity, the first or second rubber composition preferably has a time t10 required for reaching ML+0.1 ME of 2.0 to 6.0 minutes, more preferably 3.0 to 6.0 minutes, where ML, MH, and ME are a minimum torque, a maximum torque, and a difference therebetween (MH−ML), respectively, in a curing rate curve measured at 160° C. with a curelastometer.

The pneumatic tire of the present invention can be produced using the first and/or second rubber compositions by an ordinary method. Specifically, each unvulcanized rubber composition is extruded in the shape of a tire component; and assembled with other tire components in an ordinary manner in a tire building machine to build an unvulcanized tire. The unvulcanized tire is then heat-pressed in a vulcanizer to produce a tire.

EXAMPLES

The present invention is now more specifically described with reference to examples, but the present invention is not limited to these examples.

The chemical agents used in the examples and comparative examples are listed below.
NR: TSR20
ENR: ENR25 (degree of epoxidation: 25 mol %) available from Kumpulan Guthrie Berhad (Malaysia)
IR: IR2200 available from JSR CORPORATION
Modified BR: BR1250H (tin-modified BR polymerized with a lithium initiator; vinyl content: 10 to 13% by mass; Mw/Mn: 1.5; tin atom content: 250 ppm) available from ZEON CORPORATION High-cis BR (VCR617): VCR617 (SPB-containing BR; SPB content: 17% by mass; melting point of SPB: 200° C.; the amount of matter insoluble in boiling n-hexane: 15 to 18% by mass) available from Ube Industries, Ltd.
High-cis BR (CB25): BUNA-CB25 (BR synthesized with an Nd catalyst; cis content: 96 mol %) available from LANXESS K.K. Butyl-based rubber: Chlorobutyl HT1066 (chlorobutyl rubber) available from Japan Butyl Co., Ltd.
Silica (VN3): ULTRASIL VN3 ($N_2SA$: 175 $m^2/g$) available from Evonik Degussa
Silica (Z1085Gr): Z1085Gr ($N_2SA$: 80 $m^2/g$) available from Rhodia Carbon black (HP160): HP160 (CTAB: 163 $m^2/g$; COAN: 97 mL/100 g) available from Evonik Degussa
Carbon black (N660): N660 (CTAB: 36 $m^2/g$; COAN: 74 mL/100 g) available from Jiangix Black Cat
Carbon black (N550): SHOBLACK N550 (CTAB: 43 $m^2/g$; COAN: 80 mL/100 g) available from Cabot Corporation
Silane coupling agent: Si75 (bis(3-triethoxysilylpropyl)disulfide) available from Evonik Degussa
Tackifying resin: Marukarez T-100AS (C5 petroleum resin: aliphatic petroleum resin formed mainly from olefins and diolefins in C5 fraction obtained by naphtha cracking) (softening point: 100° C.) available from Maruzen Petrochemical Co., Ltd.
Coumarone-indene resin: NOVARES C10 (coumarone-indene resin; softening point: 5° C. to 15° C.) available from Rutgers Chemicals
Oil: Vivatec 500 available from H&R
Wax: Ozoace 0355 available from Nippon Seiro Co., Ltd.
Antioxidant 6PPD: Antigene 6C (N-phenyl-N'-(1,3-dimethylbutyl)-p-phenylenediamine) available from Sumitomo Chemical Co., Ltd.
Antioxidant RD: Antage RD (polymerized 2,2,4-trimethyl-1,2-dihydroquinoline) available from Kawaguchi Chemical Industry Co., LTD.
Calcium stearate: calcium stearate available from NOF Corporation
Stearic acid: TSUBAKI available from NOF Corporation
Zinc oxide: zinc oxide #2 available from MITSUI MINING & SMELTING CO., LTD.
HTS: DURALINK HTS (sodium hexamethylene-1,6-bisthiosulfate dihydrate) available from Flexsys
KA9188: Vulcuren VP KA9188 (1,6-bis(N,N'-dibenzylthiocarbamoyldithio)hexane) available from LANXESS K.K.
Alkylphenol-sulfur chloride condensate 1 (V200): Tackirol V200 (an alkylphenol-sulfur chloride condensate represented by the formula (3); sulfur content: 24% by mass; weight average molecular weight: 9000) available from Taoka Chemical Co., Ltd. Alkylphenol-sulfur chloride condensate 2: TS3101 (trial product) (the alkylphenol-sulfur chloride condensate represented by the following formula; sulfur content: 27% by mass; weight average molecular weight: 62000) available from Taoka Chemical Co., Ltd.

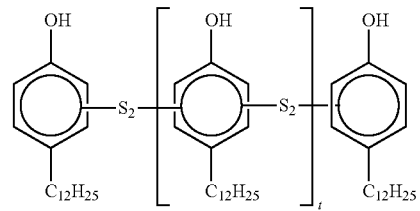

(wherein t represents an integer of 150 to 200.) 10% oil-containing insoluble sulfur: Seimi sulfur (60% of matter insoluble in carbon disulfide and 10% of oil) available from Nippon Kanryu Industry Co., Ltd.

Vulcanization accelerator (TBBS): Nocceler NS (N-tert-butyl-2-benzothiazolyl sulfenamide) (formula below) available from Ouchi Shinko Chemical Industrial Co., Ltd.

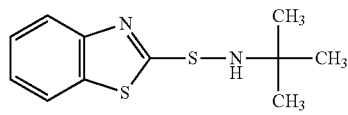

Vulcanization accelerator (DM): Nocceler DM (di-2-benzothiazolyl disulfide) (formula below) available from Ouchi Shinko Chemical Industrial Co., Ltd.

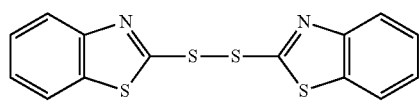 [SMILES: c1ccc2sc(SSc3nc4ccccc4s3)nc2c1]

Vulcanization accelerator (DCBS): Nocceler DZ (N,N'-dicyclohexyl-2-benzothiazolyl sulfenamide) (formula below) available from Ouchi Shinko Chemical Industrial Co., Ltd.

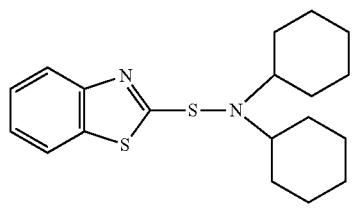 [SMILES: c1ccc2sc(SN(C3CCCCC3)C3CCCCC3)nc2c1]

Vulcanization accelerator (BEHZ): BEHZ (N,N-di(2-ethylhexyl)-2-benzothiazolyl sulfenamide) (formula below) available from Kawaguchi Chemical Industry Co., LTD.

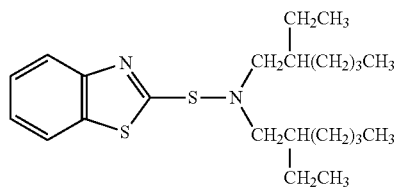

Vulcanization accelerator (TBSI): Santocure TBSI (N-tert-butyl-2-benzothiazolyl sulfenimide) (formula below) available from Flexsys

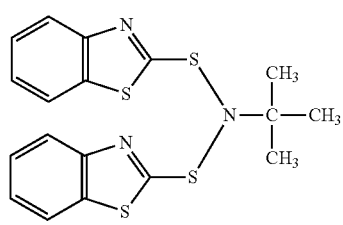 [SMILES: CC(C)(C)N(Sc1nc2ccccc2s1)Sc1nc2ccccc2s1]

According to each of the compositions shown in Tables 1 to 3, the chemical agents except the sulfur, vulcanization accelerators, and hybrid crosslinking agents (alkylphenol-sulfur chloride condensates, KA9188, and HTS) were mixed and kneaded together using a 1.7 L-Banbury mixer. Next, the sulfur, vulcanization accelerator(s), and hybrid crosslinking agent (alkylphenol-sulfur chloride condensate, KA9188, HTS) were added and kneaded into the obtained kneaded mixture using a roll mill. Thus, an unvulcanized rubber composition was obtained. The obtained unvulcanized rubber composition was press-vulcanized at 170° C. for 11 minutes (or at 150° C. for 30 minutes in the case of the tread formulation). Thus, a vulcanized rubber composition was obtained.

The unvulcanized rubber compositions and vulcanized rubber compositions were evaluated in the following manner. Tables 1 to 3 show the results.

(Curing Rate)

Each unvulcanized rubber composition was subjected to a curing test at a measurement temperature of 160° C. using an oscillating curemeter (curelastometer) described in JIS K 6300 to obtain a curing rate curve where torque was plotted against time. The time t10 (min) required for reaching ML+0.1 ME was calculated, where ML, MH, and ME are the minimum torque, the maximum torque, and the difference therebetween (MH−ML), respectively, in the curing rate curve.

Considering compound scorch, productivity and other properties, t10 is preferably 3.0 to 5.0 in the case of the tread formulation and the inner liner formulation, and is preferably 2.5 to 5.0 in the case of the sidewall formulation.

(Extrusion Processability)

Each unvulcanized rubber composition was extruded, and each extrudate was formed into the shape of a component (tread, inner liner, or sidewall). Then, the edge profile of each formed product, compound scorch, the degree of adhesion between rubbers, and flatness were evaluated visually and by touch. The results are expressed as an index relative to that of Comparative Example 1 or 5, or Example 16 (=100). A higher numerical value indicates better sheet processability.

In the case of the tread formulation and the sidewall formulation, an index value of more than 90 is preferred. In the case of the inner liner formulation, an index value of more than 100 is preferred.

As for the edge profile, the straightest and smoothest edges were evaluated as good. As for the compound scorch, when a 15 cm square sheet having a thickness of 2 mm was cut out of each formed product and found to have no irregularities due to cured bits, it was evaluated as good. As for the flatness, if such a sheet was flat enough to adhere tightly to a flat plate, it was evaluated as good.

(Viscoelasticity Test)

The complex elastic modulus (E*) (MPa) and loss tangent (tan δ) of each vulcanized rubber composition were measured using a viscoelasticity spectrometer VES available from Iwamoto Seisakusho Co., Ltd. at a temperature of 70° C., a frequency of 10 Hz, an initial strain of 10%, and a dynamic strain of 2%. A higher E* value indicates higher rigidity and better hardness (better handling stability). A lower tan δ value indicates lower heat build-up and better fuel economy.

In the case of the tread formulation, an E* value of 5.70 to 6.30 is preferred, and a tan δ value of less than 0.100 is preferred. In the case of the inner liner formulation, an E* value of 3.00 to 3.80 is preferred, and a tan δ value of less than 0.140 is preferred. In the case of the sidewall formulation, an E* value of 3.10 to 3.80 is preferred, and a tan δ value of less than 0.110 is preferred.

(Tensile Test)

A No. 3 dumbbell specimen prepared from each vulcanized rubber composition was subjected to a tensile test at room temperature in accordance with JIS K 6251 "Rubber, vulcanized or thermoplastic—Determination of tensile stress-strain properties," and the elongation at break EB (%) was measured. A higher EB value indicates better elongation at break.

In the case of the tread formulation, an EB value of higher than 520 is preferred; in the case of the inner liner formulation, an EB value of higher than 540 is preferred; and in the case of the sidewall formulation, an EB value of higher than 400 is preferred.

TABLE 1

(Tread formulation for tires for trucks and busses)

|  |  | Examples | | | | | | | Comparative Examples | | | |
|---|---|---|---|---|---|---|---|---|---|---|---|---|
|  |  | 1 | 2 | 3 | 4 | 5 | 6 | 7 | 1 | 2 | 3 | 4 |
| Composition (part(s) by mass) | High-cis BR (CB25) | — | 20 | 30 | — | — | — | — | — | 20 | 40 | — |
|  | NR | 100 | 80 | 60 | 100 | 100 | 100 | 100 | 100 | 80 | 40 | 100 |
|  | IR | — | — | 10 | — | — | — | — | — | — | 20 | — |
|  | Silica (VN3) | — | — | — | — | — | — | 10 | — | — | — | — |
|  | Carbon black (HP160) | 45 | 45 | 45 | 45 | 45 | 45 | 40 | 45 | 45 | 45 | 45 |
|  | Silane coupling agent | — | — | — | — | — | — | 0.8 | — | — | — | — |
|  | Coumarone-indene resin | 2 | 2 | 2 | 2 | 2 | 2 | 2 | 2 | 2 | 2 | 2 |
|  | Wax | 1.5 | 1.5 | 1.5 | 1.5 | 1.5 | 1.5 | 1.5 | 1.5 | 1.5 | 1.5 | 1.5 |
|  | Antioxidant 6PPD | 4 | 4 | 4 | 4 | 4 | 4 | 4 | 4 | 4 | 4 | 4 |
|  | Stearic acid | 2 | 2 | 2 | 2 | 2 | 2 | 2 | 2 | 2 | 2 | 2 |
|  | Zinc oxide | 4 | 4 | 4 | 4 | 4 | 4 | 4 | 4 | 4 | 4 | 4 |
|  | KA9188 | — | — | — | — | — | 2 | — | — | — | — | — |
|  | Alkylphenol-sulfur chloride condensate 1 (V200) | — | — | — | — | 0.8 | — | — | — | — | — | 1 |
|  | 10% oil-containing insoluble sulfur | 1.5 | 1.5 | 1.5 | 1.5 | 1 | 1 | 1.5 | 1.5 | 1.5 | 1.5 | 1 |
|  | TBBS | — | — | — | 0.9 | — | — | — | 1.5 | 1.5 | 1.5 | 1.5 |
|  | TBSI | 1.8 | 1.8 | 1.5 | 0.8 | 2.2 | 1.8 | 1.8 | — | — | — | — |
| Evaluation | Curing rate (t10(min)) Target 3.0-5.0 | 3.3 | 3.6 | 4.0 | 3.0 | 3.2 | 3.8 | 4.3 | 2.8 | 3.2 | 4.2 | 1.8 |
|  | Extrusion processability Target > 90 | 110 | 115 | 120 | 110 | 100 | 110 | 100 | 100 | 105 | 70 | 80 |
|  | Handling stability (E* at 70° C.) Target 5.70-6.30 | 5.95 | 6.10 | 5.91 | 5.82 | 5.97 | 6.01 | 5.94 | 5.96 | 5.98 | 6.27 | 5.97 |
|  | Rolling property (tan δ at 70° C.) Target < 0.100 | 0.098 | 0.096 | 0.099 | 0.100 | 0.094 | 0.096 | 0.096 | 0.112 | 0.104 | 0.097 | 0.096 |
|  | Tensile strength at break (EB %) Target > 520 | 575 | 540 | 530 | 560 | 535 | 595 | 595 | 525 | 505 | 455 | 505 |

TABLE 2

(Inner liner formulation)

|  |  | Examples | | | | Comparative Examples | | | | | | |
|---|---|---|---|---|---|---|---|---|---|---|---|---|
|  |  | 8 | 9 | 10 | 11 | 5 | 6 | 7 | 8 | 9 | 10 | 11 |
| Composition (part(s) by mass) | NR | — | — | — | — | — | — | — | — | 20 | — | — |
|  | ENR | 100 | 70 | 100 | 100 | 100 | 70 | 100 | 60 | — | 100 | 100 |
|  | Butyl-based rubber | — | 30 | — | — | — | 30 | — | 40 | 80 | — | — |
|  | Silica (Z1085Gr) | 40 | 40 | 15 | 40 | 40 | 40 | — | 40 | — | 40 | 40 |
|  | Carbon black (N660) | 5 | 5 | 30 | 5 | 5 | 5 | 45 | 5 | 45 | 5 | 5 |
|  | Silane coupling agent | 2.4 | 2.4 | 0.9 | 2.4 | 2.4 | 2.4 | — | 2.4 | — | 2.4 | 2.4 |
|  | Oil | 4 | 4 | 4 | 4 | 4 | 4 | 4 | 4 | 4 | 4 | 4 |
|  | Antioxidant RD | 1 | 1 | 1 | 1 | 1 | 1 | 1 | 1 | 1 | 1 | 1 |
|  | Calcium stearate | 2 | 2 | 2 | 2 | 2 | 2 | 2 | 2 | 2 | 2 | 2 |
|  | Zinc oxide | 3 | 3 | 3 | 3 | 3 | 3 | 3 | 3 | 3 | 3 | 3 |
|  | Alkylphenol-sulfur chloride condensate 1 (V200) | — | — | — | 0.4 | — | — | — | — | — | — | — |
|  | 10% oil-containing insoluble sulfur | 1.6 | 1.6 | 1.6 | 1.2 | 1.6 | 1.6 | 1.6 | 1.6 | 0.5 | 1.6 | 0.4 |
|  | TBBS | — | — | — | — | 2 | 2 | 2 | — | — | 1.8 | — |
|  | DM | — | — | — | — | — | — | — | — | 1.2 | — | — |
|  | BEHZ | — | — | 3 | — | — | — | — | — | — | — | — |
|  | TBSI | 2 | 2 | — | 2 | — | — | — | 2 | — | 0.2 | 8 |
| Evaluation | Curing rate (t10(min)) Target 3.0-5.0 | 3.7 | 4.4 | 3.0 | 3.1 | 2.7 | 3.4 | 1.6 | 4.9 | 3.5 | 2.9 | 2.7 |
|  | Extrusion processability Target > 100 | 120 | 130 | 110 | 110 | 100 | 115 | 70 | 130 | 110 | 100 | 90 |
|  | Handling stability (E* at 70° C.) Target 3.00-3.80 | 3.33 | 3.28 | 3.27 | 3.39 | 3.55 | 3.39 | 3.41 | 3.35 | 3.62 | 3.58 | 3.48 |

TABLE 2-continued (Inner liner formulation)

|  |  | Examples | | | | Comparative Examples | | | | | | |
|---|---|---|---|---|---|---|---|---|---|---|---|---|
|  |  | 8 | 9 | 10 | 11 | 5 | 6 | 7 | 8 | 9 | 10 | 11 |
|  | Rolling property (tan δ at 70° C.) Target < 0.140 | 0.115 | 0.138 | 0.118 | 0.101 | 0.124 | 0.144 | 0.132 | 0.151 | 0222 | 0.122 | 0.105 |
|  | Tensile strength at break (EB %) Target > 540 | 550 | 575 | 640 | 555 | 520 | 525 | 470 | 600 | 605 | 525 | 415 |

TABLE 3

(Sidewall formulation)

|  |  | Examples | | | | | | | | |
|---|---|---|---|---|---|---|---|---|---|---|
|  |  | 12 | 13 | 14 | 15 | 16 | 17 | 18 | 19 | 20 |
| Composition (part(s) by mass) | Modified BR (BR1250H) | 25 | 25 | 25 | 25 | 25 | 25 | 25 | 25 | 25 |
|  | High-cis BR (VCR617) | 25 | 25 | 25 | 25 | 25 | 25 | 25 | 25 | 25 |
|  | NR | 50 | 50 | 50 | 50 | 50 | 50 | 50 | 50 | 50 |
|  | Silica (VN3) | — | — | — | — | 10 | — | — | — | — |
|  | Carbon black (N550) | 40 | 40 | 40 | 40 | 35 | 40 | 40 | 40 | 40 |
|  | Tackifying resin (T-100As) | 2 | 2 | 2 | 2 | 2 | 2 | 2 | 2 | 2 |
|  | Coumarone-indene resin | 3 | 3 | 3 | 3 | 3 | 3 | 3 | 3 | 3 |
|  | Wax | 1.5 | 1.5 | 1.5 | 1.5 | 1.5 | 1.5 | 1.5 | 1.5 | 1.5 |
|  | Antioxidant 6PPD | 4 | 4 | 4 | 4 | 4 | 4 | 4 | 4 | 4 |
|  | Stearic acid | 2 | 2 | 2 | 2 | 2 | 2 | 2 | 2 | 2 |
|  | Zinc oxide | 4 | 4 | 4 | 4 | 4 | 4 | 4 | 4 | 4 |
|  | HTS | — | — | — | — | — | — | — | — | — |
|  | KA9188 | — | — | — | — | — | — | — | — | — |
|  | Alkylphenol-sulfur chloride condensate 1 (V200) | 1.5 | — | 0.4 | 4 | 4 | 1.5 | 0.4 | 0.4 | 0.4 |
|  | Alkylphenol-sulfur chloride condensate 2 | — | 1.5 | — | — | — | — | — | — | — |
|  | 10% oil-containing insoluble sulfur | 1.9 | 1.9 | 2 | 0.8 | 0.8 | 1 | 1 | 1 | 0.7 |
|  | TBBS | — | — | — | — | — | — | — | — | — |
|  | DCBS | — | — | — | — | — | — | — | — | — |
|  | BEHZ | — | — | — | — | — | — | — | 4 | 6 |
|  | TBSI | 1 | 1 | 1 | 1 | 1 | 2.5 | 3 | — | — |
| Evaluation | Curing rate (t10(min)) Target 2.5-5.0 | 3.5 | 4.0 | 4.0 | 2.7 | 3.5 | 3.3 | 3.7 | 3.6 | 3.2 |
|  | Extrusion processability Target > 90 | 125 | 125 | 115 | 100 | 120 | 115 | 115 | 115 | 105 |
|  | Handling stability (E* at 70° C.) Target 3.10-3.80 | 3.58 | 3.55 | 3.55 | 3.71 | 3.58 | 3.62 | 3.60 | 3.55 | 3.58 |
|  | Rolling property (tan δ at 70° C.) Target < 0.110 | 0.098 | 0.095 | 0.109 | 0.085 | 0.079 | 0.091 | 0.098 | 0.097 | 0.095 |
|  | Tensile strength at break (EB %) Target > 400 | 550 | 570 | 555 | 475 | 515 | 515 | 465 | 550 | 420 |

|  |  | Examples | | Comparative Examples | | | | | | |
|---|---|---|---|---|---|---|---|---|---|---|
|  |  | 21 | 22 | 12 | 13 | 14 | 15 | 16 | 17 | 18 |
| Composition (part(s) by mass) | Modified BR (BR1250H) | 25 | 25 | 25 | 25 | 25 | 25 | 25 | 25 | 25 |
|  | High-cis BR (VCR617) | 25 | 25 | 25 | 25 | 25 | 25 | 25 | 25 | 25 |
|  | NR | 50 | 50 | 50 | 50 | 50 | 50 | 50 | 50 | 50 |
|  | Silica (VN3) | — | — | — | — | — | — | — | — | — |
|  | Carbon black (N550) | 40 | 40 | 40 | 40 | 40 | 40 | 40 | 40 | 40 |
|  | Tackifying resin (T-100As) | 2 | 2 | 2 | 2 | 2 | 2 | 2 | 2 | 2 |
|  | Coumarone-indene resin | 3 | 3 | 3 | 3 | 3 | 3 | 3 | 3 | 3 |
|  | Wax | 1.5 | 1.5 | 1.5 | 1.5 | 1.5 | 1.5 | 1.5 | 1.5 | 1.5 |
|  | Antioxidant 6PPD | 4 | 4 | 4 | 4 | 4 | 4 | 4 | 4 | 4 |
|  | Stearic acid | 2 | 2 | 2 | 2 | 2 | 2 | 2 | 2 | 2 |
|  | Zinc oxide | 4 | 4 | 4 | 4 | 4 | 4 | 4 | 4 | 4 |
|  | HTS | — | — | — | — | — | — | — | 1.5 | — |
|  | KA9188 | — | — | — | — | — | — | — | — | 1.5 |
|  | Alkylphenol-sulfur chloride condensate 1 (V200) | 5 | 1.5 | 1.5 | — | 0.4 | 8 | 1.5 | — | — |
|  | Alkylphenol-sulfur chloride condensate 2 | — | — | — | — | — | — | — | — | — |
|  | 10% oil-containing insoluble sulfur | 0.6 | 1.9 | 1.9 | 2.1 | 0.7 | 0.4 | 1.9 | 1.9 | 1.9 |
|  | TBBS | — | — | 0.8 | — | — | — | — | — | — |
|  | DCBS | — | 0.7 | — | — | — | 1 | — | — | — |
|  | BEHZ | — | — | — | — | 8 | — | — | — | — |
|  | TBSI | 1 | 0.5 | — | 1 | — | 1 | — | 1 | 1 |

TABLE 3-continued (Sidewall formulation)

| Evaluation | | | | | | | | | | |
|---|---|---|---|---|---|---|---|---|---|---|
| Curing rate (t10(min)) Target 2.5-5.0 | 2.6 | 3.9 | 2.2 | 4.2 | 2.9 | 1.5 | 3.9 | 4.5 | 4.8 |
| Extrusion processability Target > 90 | 120 | 120 | 120 | 110 | 60 | 115 | 120 | 120 | 120 |
| Handling stability (E* at 70° C.) Target 3.10-3.80 | 3.33 | 3.57 | 3.55 | 3.58 | 3.61 | 3.66 | 3.15 | 3.25 | 3.05 |
| Rolling property (tan δ at 70° C.) Target < 0.110 | 0.070 | 0.109 | 0.106 | 0.119 | 0.094 | 0.081 | 0.114 | 0.114 | 0.118 |
| Tensile strength at break (EB %) Target > 400 | 410 | 545 | 540 | 555 | 385 | 350 | 560 | 545 | 570 |

In the examples in which a specific vulcanization accelerator (a compound represented by the formula (1)) and an isoprene-based rubber were used in predetermined amounts, the curing rate was good, and the extrusion processability, handling stability, fuel economy, and tensile strength at break were achieved in a balanced manner.

These properties were also achieved in a favorable manner in the examples in which a specific vulcanization accelerator (a compound represented by the formula (1)) and an alkylphenol-sulfur chloride condensate were used in predetermined amounts.

When rubber compositions for a clinch, base tread, or tie gum were prepared using a specific vulcanization accelerator (such as TBSI) and an isoprene-based rubber in predetermined amounts, these rubber compositions also provided the above properties in a favorable manner. When rubber compositions for such components were prepared using a specific vulcanization accelerator and an alkylphenol-sulfur chloride condensate in predetermined amounts, they also provided good properties.

The invention claimed is:

1. A pneumatic tire, comprising at least one of a tread and an inner liner, each comprising a rubber composition for a tire,
   the rubber composition comprising an isoprene-based rubber and a compound represented by formula (1) below, wherein an amount of the isoprene-based rubber is at least 70% by mass based on 100% by mass of a rubber component of the rubber composition; and
   an amount of the compound represented by formula (1) is 0.5 to 6 parts by mass, an amount of sulfur is not more than 1.8 parts by mass, and a combined amount of guanidine vulcanization accelerators and N,N'-dicyclohexyl-2-benzothiazolyl sulfenamide is not more than 0.7 parts by mass, each per 100 parts by mass of the rubber component:

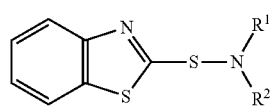

(1)

wherein $R^1$ represents a $C_2$-$C_{16}$ alkyl group; and $R^2$ represents a $C_3$-$C_{16}$ alkyl, benzothiazolyl-sulfide, or cycloalkyl group.

2. A pneumatic tire, comprising at least one of a sidewall and a clinch, each comprising a rubber composition for a tire,
   the rubber composition comprising an alkylphenol-sulfur chloride condensate and a compound represented by formula (1) below, wherein an amount of the alkylphenol-sulfur chloride condensate is 0.4 to 6 parts by mass, an amount of the compound represented by formula (1) is 0.5 to 6 parts by mass, an amount of sulfur is not more than 1.8 parts by mass, and a combined amount of guanidine vulcanization accelerators and N,N'-dicyclohexyl-2-benzothiazolyl sulfenamide is not more than 0.7 parts by mass, each per 100 parts by mass of a rubber component of the rubber composition:

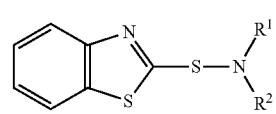

(1)

wherein $R^1$ represents a $C_2$-$C_{16}$ alkyl group; and $R^2$ represents a $C_3$-$C_{16}$ alkyl, benzothiazolyl-sulfide, or cycloalkyl group.

3. The pneumatic tire according to claim 1, comprising at least one of butadiene rubber and a butyl-based rubber.

4. The pneumatic tire according to claim 1,
   wherein in the rubber composition for a tire, an amount of carbon black is 3 to 80 parts by mass, and an amount of wet silica is not more than 50 parts by mass, each per 100 parts by mass of the rubber component.

5. The pneumatic tire according to claim 1,
   wherein the rubber composition for a tire has a time t10 required for reaching ML+0.1 ME of 2.0 to 6.0 minutes, where ML, MH, and ME are a minimum torque, a maximum torque, and a difference therebetween (MH−ML), respectively, in a curing rate curve measured at 160° C. with a curelastometer.

6. The pneumatic tire according to claim 1, comprising a compound represented by the following formula (4):

(4)

wherein W represents a $C_2$-$C_{10}$ alkylene group; and $R^{11}$ and $R^{12}$ are the same or different and each represent a monovalent organic group containing a nitrogen atom.

7. The pneumatic tire according to claim 1, comprising at least one of a coumarone-indene resin and a C5 petroleum resin.

8. The pneumatic tire according to claim 1, comprising an alkaline salt of a fatty acid and a metal.

9. The pneumatic tire according to claim 2, comprising at least one of butadiene rubber and a butyl-based rubber.

10. The pneumatic tire according to claim 2,
    wherein in the rubber composition for a tire, an amount of carbon black is 3 to 80 parts by mass, and an amount of wet silica is not more than 50 parts by mass, each per 100 parts by mass of the rubber component.

11. The pneumatic tire according to claim 3,
    wherein in the rubber composition for a tire, an amount of carbon black is 3 to 80 parts by mass, and an amount of wet silica is not more than 50 parts by mass, each per 100 parts by mass of the rubber component.

12. The pneumatic tire according to claim 2, wherein the rubber composition for a tire has a time t10 required for reaching ML+0.1 ME of 2.0 to 6.0 minutes, where ML, MH, and ME are a minimum torque, a maximum torque, and a difference therebetween (MH−ML), respectively, in a curing rate curve measured at 160° C. with a curelastometer.

13. The pneumatic tire according to claim 3, wherein the rubber composition for a tire has a time t10 required for reaching ML+0.1 ME of 2.0 to 6.0 minutes, where ML, MH, and ME are a minimum torque, a maximum torque, and a difference therebetween (MH−ML), respectively, in a curing rate curve measured at 160° C. with a curelastometer.

14. The pneumatic tire according to claim 4, wherein the rubber composition for a tire has a time t10 required for reaching ML+0.1 ME of 2.0 to 6.0 minutes, where ML, MH, and ME are a minimum torque, a maximum torque, and a difference therebetween (MH−ML), respectively, in a curing rate curve measured at 160° C. with a curelastometer.

15. The pneumatic tire according to claim 2, comprising a compound represented by the following formula (4):

$$R^{11}-S-S-W-S-S-R^{12} \qquad (4)$$

wherein W represents a $C_2$-$C_{10}$ alkylene group; and $R^{11}$ and $R^{12}$ are the same or different and each represent a monovalent organic group containing a nitrogen atom.

16. The pneumatic tire according to claim 3, comprising a compound represented by the following formula (4):

$$R^{11}S-S-W-S-S-R^{12} \qquad (4)$$

wherein W represents a $C_2$-$C_{10}$ alkylene group; and $R^{11}$ and $R^{12}$ are the same or different and each represent a monovalent organic group containing a nitrogen atom.

17. The pneumatic tire according to claim 4, comprising a compound represented by the following formula (4):

$$R^{11}-S-S-W-S-S-R^{12} \qquad (4)$$

wherein W represents a $C_2$-$C_{10}$ alkylene group; and $R^{11}$ and $R^{12}$ are the same or different and each represent a monovalent organic group containing a nitrogen atom.

18. The pneumatic tire according to claim 5, comprising a compound represented by the following formula (4):

$$R^{11}-S-S-W-S-S-R^{12} \qquad (4)$$

wherein W represents a $C_2$-$C_{10}$ alkylene group; and $R^{11}$ and $R^{12}$ are the same or different and each represent a monovalent organic group containing a nitrogen atom.

19. The pneumatic tire according to claim 2, comprising at least one of a coumarone-indene resin and a C5 petroleum resin.

20. The pneumatic tire according to claim 3, comprising at least one of a coumarone-indene resin and a C5 petroleum resin.

\* \* \* \* \*